(12) United States Patent
McMillan, Jr. et al.

(10) Patent No.: US 12,248,574 B1
(45) Date of Patent: Mar. 11, 2025

(54) AI IDENTIFICATION OF COMPUTER RESOURCES SUBJECTED TO RANSOMWARE ATTACK

(71) Applicant: Index Engines Inc., Holmdel, NJ (US)

(72) Inventors: Ben Henry McMillan, Jr., Middletown, NJ (US); Jairo Orlando Esteban, Freehold, NJ (US)

(73) Assignee: Index Engines Inc., Holmdel, NJ (US)

( * ) Notice: Subject to any disclaimer, the term of this patent is extended or adjusted under 35 U.S.C. 154(b) by 0 days.

(21) Appl. No.: 18/776,575

(22) Filed: Jul. 18, 2024

(51) Int. Cl.
*G06F 21/56* (2013.01)
(52) U.S. Cl.
CPC ...... *G06F 21/566* (2013.01); *G06F 2221/034* (2013.01)
(58) Field of Classification Search
CPC .................. G06F 21/566; G06F 2221/034
See application file for complete search history.

(56) References Cited

U.S. PATENT DOCUMENTS

| | | | | |
|---|---|---|---|---|
| 11,714,903 | B1* | 8/2023 | Jia | G06F 21/566 726/24 |
| 2019/0108340 | A1* | 4/2019 | Bedhapudi | G06F 21/554 |
| 2021/0357504 | A1* | 11/2021 | Saad | G06F 21/567 |
| 2023/0026135 | A1* | 1/2023 | Albero | G06F 21/56 |
| 2023/0229773 | A1* | 7/2023 | Madden, Jr. | G06F 21/554 726/23 |
| 2023/0403289 | A1* | 12/2023 | Karpovsky | G06N 20/20 |
| 2024/0223596 | A1* | 7/2024 | Sellars | H04L 63/1433 |

FOREIGN PATENT DOCUMENTS

| | | | | |
|---|---|---|---|---|
| CN | 117556197 | A * | 2/2024 | ........... G06F 18/15 |
| CN | 117851819 | A * | 4/2024 | ........... G06F 18/214 |

(Continued)

OTHER PUBLICATIONS

Vasseur, Pedro R., âA Machine Learning Approach to Verify and Reduce False Positive Alarms Generated by Data Breach Detection Processesa, Siedenberg School of Computing and Information Systems, Pace University, p. 1-24 (Year: 2018).*

(Continued)

*Primary Examiner* — Christopher A Revak
(74) *Attorney, Agent, or Firm* — Sunstein LLP

(57) ABSTRACT

A method provides a set of computer data statistical profiles derived from a corresponding set of samples of computer data to a ransomware detection system and obtains a prediction of the likelihood of a ransomware attack in the set of samples of computer data. The system utilizes a machine learning system trained to achieve data models, with each model trained initially on a corresponding cluster of curated computer data statistics profiles, each cluster including statistics characterizing a corresponding cluster of curated samples resulting from exposing a selection of raw data samples to processing by actual ransomware. Each model is subject to iterations against initial validation data until performance convergences, with sample sources from the same backups not being present in both training and validation models. The models have been subject to final validation against actual customer data to address data drift that would otherwise result in excessive false predictions.

16 Claims, 12 Drawing Sheets

(56) References Cited

FOREIGN PATENT DOCUMENTS

| CN | 118471475 A | * | 8/2024 | ............. G16H 50/20 |
| WO | WO-2024067248 A1 | * | 4/2024 | ............ G06F 18/214 |

OTHER PUBLICATIONS

Morlina-Coronado et al, Efficient concept drift handling for batch android malware detection models, Pervasive and Mobile Computing, vol. 96, p. 1-31 (Year: 2023).*

Darem et al, An Adaptive Behavioral-Based Incremental Batch Learning Malware Variants Detection Model Using Concept Drift Detection and Sequential Deep Learning, IEEE Access, p. 1-17 (Year: 2021).*

* cited by examiner

Ransomware Variants 301

| | | |
|---|---|---|
| 1101 | CryptoJoker-encrypted Ransomware | 10/17/2021 | 4 |
| 1102 | CryptoJoker-nocry Ransomware | 11/9/2020 | 5 |
| 1103 | CryptoJoker-plutocrypt Ransomware | 4/14/2023 | 4 |
| 1104 | CryptoJoker Ransomware | 1/5/2016 | 4 |
| 1105 | CryptoKill Ransomware | 8/25/2018 | 4 |
| 1106 | CryptoKill Ransomware | 2/17/2017 | 4 |
| 1107 | CryptoLite Ransomware | 7/13/2018 | 4 |
| 1108 | Cryptolocker 1.0.0 Ransomware | 3/9/2017 | 1 |
| 1109 | Cryptolocker 2.0 Ransomware | 11/15/2013 | 1 |
| 1110 | CryptoLocker3 Ransomware | 12/23/2016 | 4 |
| 1111 | Cryptolocker 5.1 Ransomware | 10/6/2016 | 4 |
| 1112 | Cryptolocker Australia Ransomware | 1/17/2016 | 1 |
| 1113 | Cryptolocker.B | 5/31/2014 | 4 |
| 1114 | Cryptolocker.D | 1/24/2014 | 1 |
| 1115 | CryptoLocker-ecc Ransomware | 1/28/2021 | 4 |
| 1116 | CryptoLocker-ENCRYPTED_RSA Ran | 2/7/2020 | 4 |
| 1117 | CryptoLockerEU Ransomware | 1/4/2017 | 4 |
| 1118 | CryptoLocker Portuguese Ransomw | 2/14/2017 | 1 |
| 1119 | Cryptolocker Ransomware | 9/5/2013 | 4 |
| 1120 | Cryptolocker-v3 Ransomware | 2/28/2015 | 4 |
| 1121 | CryptoManiac Ransomware | 1/29/2018 | 4 |
| 1122 | CryptoMeister Ransomware | 5/15/2017 | 4 |

| | | |
|---|---|---|
| 6981 | Zorab-zorab2 Ransomware | 8/14/2020 | 4 |
| 6982 | ZorgoCry Ransomware | 5/4/2020 | 4 |
| 6983 | Zorgo Ransomware | 4/27/2020 | 4 |
| 6984 | ZORN Ransomware | 4/20/2022 | 5 |
| 6985 | Zorro Ransomware | 4/6/2017 | 4 |
| 6986 | ZqVIkE Ransomware | 11/14/2020 | 4 |
| 6987 | Zuadr Ransomware | 4/16/2021 | 4 |
| 6988 | Zuahahhah Ransomware | 8/11/2017 | 6 |
| 6989 | Zyka Ransomware | 2/4/2017 | 4 |
| 6990 | Zyklon-locked Ransomware | 4/16/2016 | 4 |
| 6991 | Zyklon-zyklon Ransomware | 5/18/2016 | 4 |
| 6992 | ZyNoXiOn Ransomware | 4/4/2020 | 4 |
| 6993 | Zyr Ransomware | 8/18/2020 | 4 |
| 6994 | Zzz12 Ransomware | 7/17/2018 | 4 |
| 6995 | Zzzz Ransomware | 11/30/2021 | 5 |
| 6996 | Chaos-MALARIA VILJS Ransomware | 5/6/2024 | 6 |
| 6997 | STOP-baaa Ransomware | 5/6/2024 | 5 |
| 6998 | STOP-qehu Ransomware | 5/6/2024 | 5 |
| 6999 | STOP-qepi Ransomware | 5/6/2024 | 5 |
| 7000 | Proton-Ripa Ransomware | 5/3/2024 | 5 |
| 7001 | Xam Ransomware | 5/7/2024 | 4 |

*Fig. 3*

Detonations-Infected Images 401

Manual Detonation 402
- Using physical disks
- Supervised, assisted
- Scheduled, routine/daily

Scripted Detonation 403
- Using virtual machines
- Unsupervised, unassisted
- Scheduled, batch runs

*Fig. 4*

Directory listing of ransomware detonated disk image file

```
-rw------- 2 root root 53687091200 Nov 30 2022 diskimage-WIN10VM-17795-c4h
-rw------- 4 root root 53687091200 Nov 30 2022 diskimage-WIN10VM-17823-glute
-r--r--r-- 2 root root 53687091200 Oct 30 2022 diskimage-WIN10VM-17827-zeronine
-rw------- 3 root root 53687091200 Nov 30 2022 diskimage-WIN10VM-17841-qolkuznbvcg
-rw------- 2 root root 53687091200 Nov 30 2022 diskimage-WIN10VM-17846-zonisonal
-rw------- 3 root root 53687091200 Nov 30 2022 diskimage-WIN10VM-17853-eking
-rw------- 2 root root 53687091200 Nov 30 2022 diskimage-WIN10VM-17856-qensvlcbymk
-rw------- 2 root root 53687091200 Nov 30 2022 diskimage-WIN10VM-17870-cov19
-rw------- 2 root root 53687091200 Nov 30 2022 diskimage-WIN10VM-17885-black-kingdom
-rw------- 3 root root 53687091200 Nov 30 2022 diskimage-WIN10VM-17892-bang
-rw------- 4 root root 53687091200 Nov 30 2022 diskimage-WIN10VM-17919-unicorn
-rw------- 2 root root 53687091200 Nov 30 2022 diskimage-WIN10VM-17952-pezi
-rw------- 2 root root 53687091200 Nov 30 2022 diskimage-WIN10VM-17956-banks1
-rw------- 2 root root 53687091200 Nov 30 2022 diskimage-WIN10VM-17965-btc-oled
-rw------- 2 root root 53687091200 Nov 30 2022 diskimage-WIN10VM-17974-zorab
-rw------- 2 root root 53687091200 Nov 30 2022 diskimage-WIN10VM-17983-bombo
-rw------- 2 root root 53687091200 Nov 30 2022 diskimage-WIN10VM-17986-elvispresley
-r--r--r-- 2 root root 53687091200 Oct 29 2022 diskimage-WIN10VM-17993-nlah
-rw------- 2 root root 53687091200 Nov 30 2022 diskimage-WIN10VM-17995-hex911
-rw------- 2 root root 53687091200 Nov 30 2022 diskimage-WIN10VM-18012-sdkxbh
-rw------- 2 root root 53687091200 Nov 30 2022 diskimage-WIN10VM-18017-bomba
-rw------- 2 root root 53687091200 Nov 30 2022 diskimage-WIN10VM-18025-frogo
-rw------- 2 root root 53687091200 Nov 30 2022 diskimage-WIN10VM-18026-well
-rw------- 2 root root 53687091200 Nov 30 2022 diskimage-WIN10VM-18034-kk11
-rw------- 3 root root 53687091200 Nov 30 2022 diskimage-WIN10VM-18041-biglock
-rw------- 2 root root 53687091200 Nov 30 2022 diskimage-WIN10VM-18044-bbc
-rw------- 2 root root 53687091200 Nov 30 2022 diskimage-WIN10VM-18046-club
-rw------- 2 root root 53687091200 Nov 30 2022 diskimage-WIN10VM-18049-wch
-rw------- 2 root root 53687091200 Nov 30 2022 diskimage-WIN10VM-18050-zwer
-rw------- 2 root root 53687091200 Nov 30 2022 diskimage-WIN10VM-18057-frm
-rw------- 2 root root 53687091200 Nov 30 2022 diskimage-WIN10VM-18061-wbqczq
-rw------- 2 root root 53687091200 Dec 1 2022 diskimage-WIN10VM-18074-dr
-rw------- 3 root root 53687091200 Dec 1 2022 diskimage-WIN10VM-18092-demomware
-rw------- 2 root root 53687091200 Dec 1 2022 diskimage-WIN10VM-18097-nypd
-rw------- 2 root root 53687091200 Dec 1 2022 diskimage-WIN10VM-18099-hlpp
-rw------- 2 root root 53687091200 Dec 1 2022 diskimage-WIN10VM-18103-hck
-rw------- 2 root root 53687091200 Dec 1 2022 diskimage-WIN10VM-18116-bad
-rw------- 2 root root 53687091200 Dec 1 2022 diskimage-WIN10VM-18124-n3f5s
-rw------- 2 root root 53687091200 Dec 1 2022 diskimage-WIN10VM-18126-tabe
-rw------- 2 root root 53687091200 Dec 1 2022 diskimage-WIN10VM-18136-gdjlosvtnib
-rw------- 2 root root 53687091200 Dec 1 2022 diskimage-WIN10VM-18152-vawe
-rw------- 2 root root 53687091200 Dec 1 2022 diskimage-WIN10VM-18153-dungeon
-r--r--r-- 2 root root 53687091200 Oct 29 2022 diskimage-WIN10VM-18171-deal-for-access
-rw------- 3 root root 53687091200 Dec 1 2022 diskimage-WIN10VM-18195-chinx
-rw------- 2 root root 53687091200 Dec 1 2022 diskimage-WIN10VM-18202-pykw
-rw------- 2 root root 53687091200 Dec 1 2022 diskimage-WIN10VM-18203-moba
-rw------- 2 root root 53687091200 Dec 1 2022 diskimage-WIN10VM-18229-how
-rw------- 2 root root 53687091200 Dec 1 2022 diskimage-WIN10VM-18237-lxhlp
-rw------- 2 root root 53687091200 Dec 1 2022 diskimage-WIN10VM-18244-java
-rw------- 3 root root 53687091200 Dec 1 2022 diskimage-WIN10VM-18246-rabbit
-rw------- 2 root root 53687091200 Dec 1 2022 diskimage-WIN10VM-18247-gyga
-rw------- 2 root root 53687091200 Dec 1 2022 diskimage-WIN10VM-18268-boot
-rw------- 2 root root 53687091200 Dec 1 2022 diskimage-WIN10VM-18282-prnds
-rw------- 2 root root 53687091200 Dec 1 2022 diskimage-WIN10VM-18283-nhlp
-rw------- 3 root root 53687091200 Dec 1 2022 diskimage-WIN10VM-18296-mazc
```

*Fig. 5*

```
CyberSense from [redacted] detected:
1 ransomware infection

1: Infected class: 4

Comparative analysis for backupset 00000011-6639c974-6da6a9445-58f24acf-k4f0a28b
Host: 3d7179864aeb08b44897ecd73172e66ea663ffc5
Client Type: Windows (1)
Root Path: /00002297-e10c-16a8-65a6-02568feb5727/
Backup Time: 2024-09-07 03:26:07 (1713063167)
Volume Label: 65eeba81d778e698feb5a44e-05_07_2024 at 03:06 PM.45-1
Model Version: 22
P/K Threshold: 56, Results: class A: 0.9874  class B: 0.0126  class 6: 0.00000
```

|                              | Prior[Full]        | Pred[Full]         |
|------------------------------|--------------------|--------------------|
| All: Size                    | 35.3GB             | 49.2GB             |
| File Count/Unique            | 198860 / 137926    | 292215 / 239159    |
| Mean File Size               | 184.9KB            | 168.5KB            |
| Entropy: Mean                | 73.80              | 82.35              |
| Threshold                    | 6373 / 3.1%        | 106385 / 36.4%     |
| File Type Mismatches         | 63734 / 33.4%      | 64817 / 22.2%      |
| Ransomware Extensions        | 968 / 0.3%         | 100518 / 34.4%     |
| Office: #/Ext/Suspect        | 34608 / 5639 / 0   | 55595 / 5701 / 0   |
| Images: #/Ext/Suspect        | 2978 / 4943 / 0    | 2982 / 4952 / 0    |
| A/V: #/Ext/Suspect           | 172 / 180 / 0      | 172 / 180 / 0      |
| Mail: #/Ext/Suspect          | 1 / 287 / 0        | 1 / 287 / 0        |
| Exec: #/Ext/Suspect          | 30916 / 37884 / 476| 33036 / 37142 / 476|
| All Others: #                | 102191             | 202229             |
| DEF Count                    | 5411               | 185423             |
| Entropy: Mean                | 73.97              | 97.61              |
| Threshold                    | 521 / 9.6%         | 100526 / 95.4%     |
| UNCHANGED: File Count        | 126 / 0.1%         | 190617 / 65.2%     |
| File Entropy                 | ...                | 73.86              |
| DEF Count                    | ...                | 5348               |
| Entropy: Mean                | ...                | 72.46              |
| Threshold                    | ...                | 521 / 9.7%         |
| DELETED/CREATED: File Count  | ...                | 101381 / 34.7%     |
| Unique Count                 | 735.4KB            | 101342 / 100.0%    |
| Mean File Size               | 50.4%              | 129.6MB            |
| Entropy: Mean                | ...                | 98.42              |
| Threshold                    | 2 / 1.6%           | 100009 / 98.6%     |
| Ransomware Extensions        | 0 / 0.0%           | 100010 / 99.6%     |
| Mismatch Count               | 87 / 69.0%         | 1170 / 1.2%        |
| Office Counts                | 20                 | 1107               |
| Image Counts                 | 62                 | 74                 |
| Exec Counts                  | 15                 | 118                |
| DEF Count                    | 0                  | 100026             |
| Entropy: Mean                | 42.87              | 98.59              |
| Threshold                    | 0 / 0.0%           | 100085 / 98.6%     |

|                              |                    |
|------------------------------|--------------------|
| Ransomware Entropy           | 93.00              |
| Ransomware Threshold         | 100085 / 100.0%    |
| Ransomware Unique Count      | 100010 / 100.0%    |
| CHANGED: File Count          | 217 / 0.1%         |
| Unique File Count            | 213 / 98.2%        |
| Mean File Size               | 6.7MB              |
| Entropy: Mean                | 36.30              |
| Threshold                    | 0 / 0.0%           |
| Mean Similarity              | 0.00               |
| Type Change                  | 5 / 2.3%           |
| DEF Count                    | 49                 |
| Entropy: Mean                | 26.83              |
| Threshold                    | 0 / 0.0%           |

CSV file containing 5 samples saved to /opt/cloud/staging/[redacted]-202445507-0306431.csv

*Fig. 6*

AI IDENTIFICATION OF COMPUTER RESOURCES SUBJECTED TO RANSOMWARE ATTACK

TECHNICAL FIELD

The present invention relates to identification of computer resources subjected to a ransomware attack, and more particularly to such identification using artificial intelligence.

BACKGROUND ART

Ransomware in an infected computer typically remains hidden until files are blocked or encrypted. Victims of a ransomware attack often cannot detect the malware until they receive a demand for ransom. A goal of ransomware detection is to identify the ransomware attack as early as possible so that victims can take action to prevent irreversible damage to their computer resources. Prior art methods of detecting a ransomware attack include (i) scanning a client's computer resources for unique signatures of ransomware, such as specific domain names, IP addresses, and file names, that are catalogued in a ransomware library; (ii) monitoring the computer resources to identify unusual activity (such as opening large numbers of files and replacing them with encrypted versions); and (iii) monitoring activity at a network level to identify unusual network traffic that might be associated with stealing or hacking data. If any of these techniques identifies a potential ransomware attack, the users can be notified. When users receive a notification of a potential ransomware attack, they can seek to stop the spread of the malware immediately, before valuable or sensitive files can be encrypted, by isolating the computer resources from the network, removing the ransomware and then restoring the computer resources from a safe backup. None of these approaches is completely reliable, however, and it is possible that the backup has itself been subject to a ransomware attack.

SUMMARY OF THE EMBODIMENTS

In accordance with a first embodiment of the invention, there is provided a method of assessing a likelihood of a presence of a ransomware attack on computer resources. The method of this embodiment includes providing as an input, to an AI ransomware detection system, a set of computer data statistical profiles derived from a corresponding set of samples of subject computer data, including data content and metadata. The method further includes obtaining from the AI ransomware detection system an output predicting the likelihood of the presence of a ransomware attack in the set of samples of subject computer data. In the context of the first embodiment, the AI ransomware detection system utilizes a machine learning system trained to achieve a plurality of data models. Each model is trained initially on a corresponding cluster of curated computer data statistics profiles. Each cluster of curated data statistics profiles are statistics characterizing a corresponding cluster of curated samples. The corresponding cluster of curated samples results from exposing a selection of raw data samples to processing by actual ransomware. Also, each selection of raw data samples reflects a corresponding set of target criteria governing the selection. Each model is subject to a plurality of iterations against initial validation data until there results a convergence of performance over successive iterations. During these iterations, there is a determination to ensure that sample sources from the same backups are not present in both training and validation models. Additionally, the plurality of data models has been subject to final validation against actual customer data to address data drift between the curated samples and the actual customer data that would otherwise result in excessive false predictions.

In a second embodiment of the invention there is provided a non-transitory computer readable storage medium encoded with instructions, that, when executive by an artificial intelligence (AI) ransomware detection system establishes computer processes for assessing a likelihood of a presence of a ransomware attack on computer resources. The computing processes include providing as an input, to the AI ransomware detection system, a set of computer data statistical profiles derived from a corresponding set of samples of subject computer data, including data content and metadata. The computer processes further include obtaining from the AI ransomware detection system an output predicting the likelihood of the presence of a ransomware attack in the set of samples of subject computer data.

Variations of the first and/or second embodiments are contemplated. In one variant, the curated samples are derived systematically from a pipeline of data from detonated backups and other sources to create training data.

In a further variant, each machine learning model has been trained to distinguish among ransomware classes selected from the group consisting of (a) clean, (b) corrupted content with original filename, (c) corrupted content with well-known ransomware file extension, and (d) corrupted content with obfuscated filename. In another variant, each machine learning model has been further trained on the corresponding cluster of curated computer data statistics profiles that comprise a selection of clean data samples not exposed to actual ransomware and a selection of artificially generated data samples.

In another variant, each machine learning model has been further trained on the corresponding cluster of curated computer data statistics profiles that comprise virtual data samples generated based on analyses of the selection of raw data samples exposed to processing by the actual ransomware, the selection of clean data samples not exposed to actual ransomware, and the selection of artificially generated data samples.

In a further variant, each cluster of curated data statistics profiles further being statistics characterizing a corresponding family of ransomware based on behavior during the processing of the raw data samples.

In another variant, each machine learning model has been subject to the plurality of iterations against the initial validation data prepared by selecting a specific composition of class samples, ransomware classes, and rates of encrypted files. In a further variant, each machine learning model has been fine-tuned after being initially training using a set of customer statistics.

BRIEF DESCRIPTION OF THE DRAWINGS

The foregoing features of embodiments will be more readily understood by reference to the following detailed description, taken with reference to the accompanying drawings, in which:

FIG. 3 is a sample of a database of ransomware variants categorized based on attack profile, in accordance with an embodiment of the present invention.

FIG. 4 is a chart showing types of detonation of ransomware employed in accordance with an embodiment of the present invention.

FIG. 5 is a sample of a directory listing of a disk image of data that have been detonated by ransomware in accordance with an embodiment of the present invention.

FIG. 6 is a statistical profile, of a data sample, developed in accordance with an embodiment of the present invention.

DETAILED DESCRIPTION OF SPECIFIC EMBODIMENTS

Figure 1:
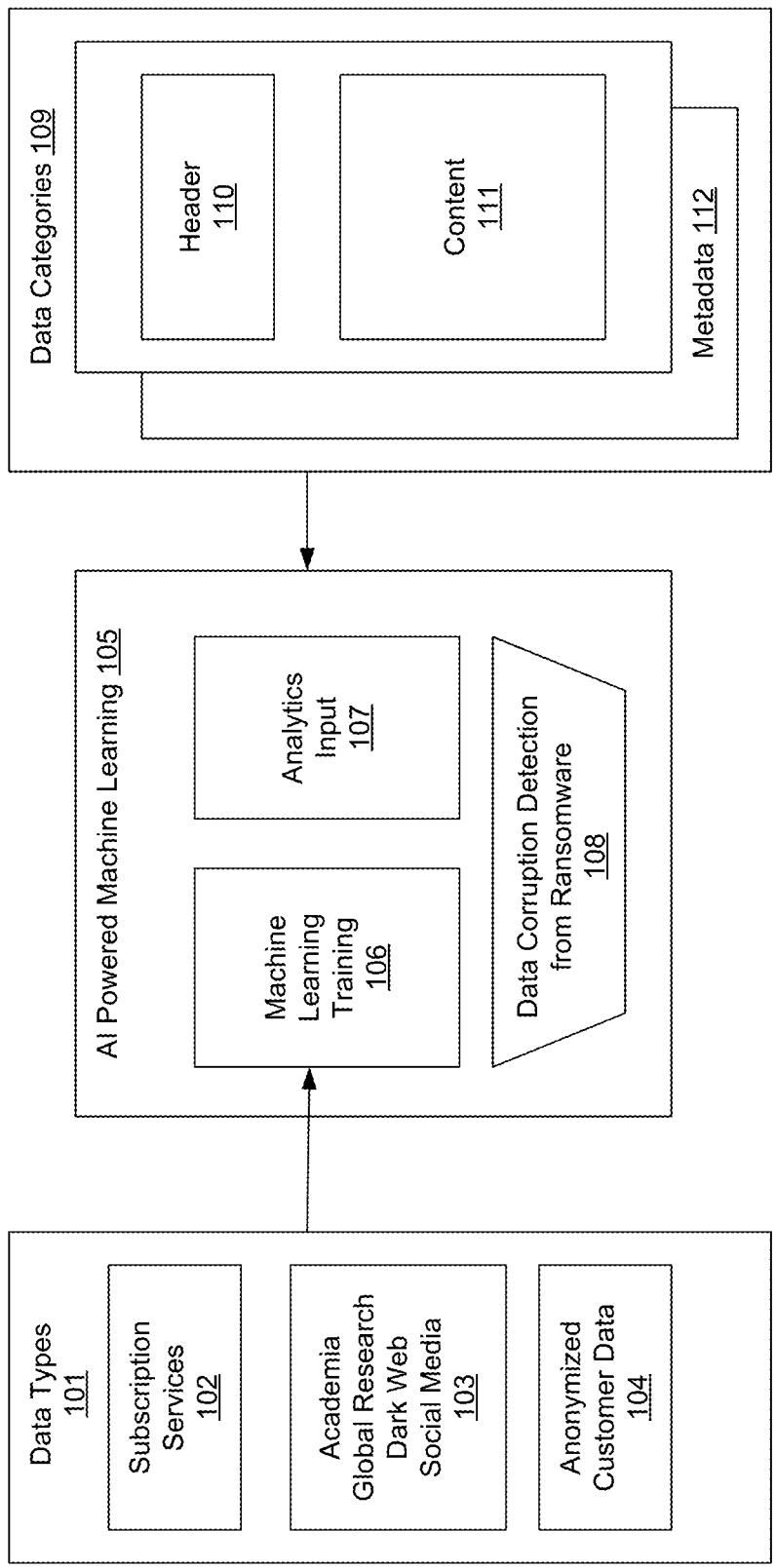
FIG. 1 is a block diagram of an AI powered machine learning system in accordance with an embodiment of the present invention, showing types of data supplied for training and data categories used as an input.

Definitions. As used in this description and the accompanying claims, the following terms shall have the meanings indicated, unless the context otherwise requires:

A "set" includes at least one member.

The singular forms "a," "an," and "the" include the plural forms as well. Thus, reference to a device in the singular (e.g., "a device," "the device"), including in the claims, includes implementations with one device and implementations with more than one of such devices. (For example, "a processor" includes implementations with one processor and implementations with more than one processor; "the processor" includes implementations with one processor and implementations with more than processor; "a memory" includes implementations with one memory and implementations with more than one memory; "the memory" includes implementations with one memory and implementations with more than memory, etc.)

A "computer process" is the performance of a described function in a computer system using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process," we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

The term "subject computer data" means computer data to be analyzed for the purpose of predicting a likelihood of a presence a ransomware attack therein.

The term "computer data index" means

The term "computer data statistical profile" means

One of the essential design goals for ransomware detection is its capability to operate effectively within an air-gapped, network-isolated vault environment. Such an environment is intentionally isolated to mitigate or minimize system exposure.

Customers typically prefer not to engage in continuous software updates within such an environment. Thus, it is imperative to provide a solution that can identify new ransomware variants without necessitating frequent updates. Although many edge-based antivirus software solutions rely on regular updates to access the latest malware patterns and behaviors, enabling them to detect emerging malware variants, it is a goal of embodiments of the present invention provide the ability to identify new ransomware variants without prior exposure.

Developing a ransomware detection algorithm meeting these requirements requires a comprehensive understanding of ransomware behavior to establish a taxonomy of behaviors applicable across various ransomware instances. Various embodiments of the present invention categorize ransomware into distinct behavioral classes rather than the specific type of corruption caused by each ransomware variant. This nuanced classification facilitates more robust detection across a spectrum of ransomware variants. This approach cannot be accomplished through simulation, only through careful analysis of ransomware attacks.

These embodiments depend on a deep-seated understanding of ransomware behaviors, which suggests that established variant families typically adhere to historical patterns. Even novel ransomware often mirrors the behaviors of known families due to code reuse, emulation of successful tactics, or involvement of individuals associated with established organizations.

FIG. 1 is a block diagram of an AI powered machine learning system in accordance with an embodiment of the present invention, showing types of data supplied for training and data categories used as an input. The training of the AI Powered Machine Learning engine 105 is from several key sources with data types 101. The data types 101 include subscription services 102, academia, research and dark web/social media 103, and anonymized customer data 104. The information from the data types 101 are used to train the machine learning model 106. The analytics generate the data categories 109, such as the file header 110, file content 111, and file metadata 112, which are fed to the machine learning engine 105 as analytics input 107. The data corruption detection 108 predicts a likelihood of files corrupted by a ransomware attack. This allows for decisions regarding the data's integrity. The analytics scan metadata of files and databases as well as deep content. This solution offers a unique level of inspection inside critical content, with 99.5% confidence.

Figure 2:
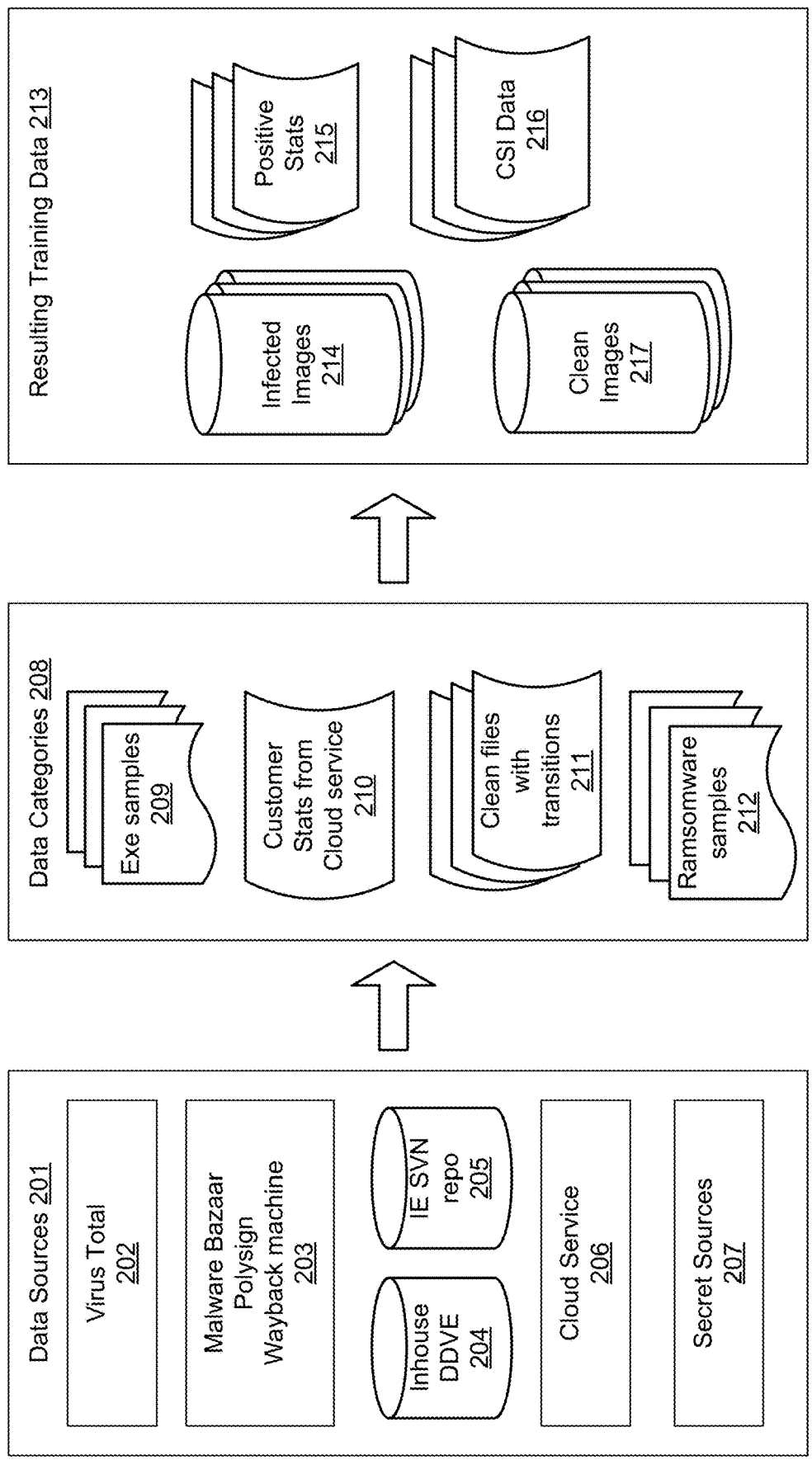
FIG. 2 is a diagram showing data sources used for developing training data, categories of data obtained from the data sources as part of an acquisition process, and the training data resulting when the training data acquisition process has been completed in accordance with an embodiment of the present invention.

FIG. 2 is a diagram showing data sources used for developing training data, categories of ransomware data obtained from the data sources as part of an acquisition process, and the training data resulting when the training data acquisition process has been completed in accordance with an embodiment of the present invention. The ransomware data sources 201 may include Virus Total 202, Malware Bazaar, Polyswarm, and Wayback Machine 203. The data sources 201 may further include Inhouse DDVE 204 comprising files and backups of internal data, service repo 205 comprising repos that change over time, cloud service 206 comprising the set of CS analytics received from the customer base, and one or more secret sources 207. The categories of data 208 from the data sources 201 may include executable samples 209, customer statistics 210 from the cloud service 206, clean files with transitions 211, and ransomware samples 212. The result of the data acquisition process includes disk images 214 that have been infected by real ransomware, positive statistics 215 generated from processing the infected images, CSI data 216 that include the analysis of the infected images, e.g. type of attack, type of encryption (technology), full/partial, file naming, encryption rate, type of files deleted/encrypted, and clean disk images 217 of systems prior to the infection.

On the acquisition of new ransomware data, the data are processed typically as follows:
1. Identifying the ransomware sample signature. Generally, the SHA256 signature is used, but others such as MD5 are just as useful.
2. Acquiring background information such as date of first encounter and results of any third-party analysis.
3. Downloading the ransomware sample from one of many repository services, such as www.virustotal.com.

There is a variety of sources for acquiring ransomware samples. The more reliable sources are analysis reports from various malware reporting news services, known ransomware researchers, ransomware reporting websites, security blogs, paid subscription services, etc. Generally, the more salient ransomware samples from these sources have already been analyzed and identified and have been cherry picked from a variety of similar redundant samples to represent the new variant. Generally, as long as the locale and environment established set up, detonation of such samples is highly reliable.

A second tier of signatures is available from service providers that accept malware submissions from victims and researchers. These providers tend to have a lot of redundancy across the identified samples. Many ransomwares are distributed through a RAAS (Ransomware-As-A-Service) system whereby distributors can customize the ransomware by changing the email address, file extension, ransom note, and other parameters, which are embedded in the ransomware executable and therefore result in a unique signature despite the fact that all these variants behave very similarly to one another. Some service providers have a large variety of meta-data available, allowing the selection of relevant results to be narrowed down.

Although ransomware acquired from reliable and human analyzed sources can be processed manually, the utter amount of new ransomware samples that become available on a daily basis (in the thousands) requires computer automation. Such automation includes querying various repositories for new ransomware samples, culling down the samples based on available meta-data information, initially identifying and naming the samples based on meta-data and any matched rules via the use of a large language model, downloading the ransomware samples from one of many repositories to an on-premises archive.

Ransomware executables often employ obfuscation techniques to evade antivirus (A/V) software defenses, making analysis more challenging. Executable packing, encryption, and code obfuscation are common methods used to encode instructions and data, complicating efforts to compare their similarity to other members of their family. These techniques hinder analysis as described below.

Packing. Packing involves compressing or encrypting an executable file to disguise its contents. Packed files must be unpacked at runtime to be executed, which can delay or prevent A/V software from analyzing the true nature of the file before it executes. There are common open source utilities for packing and unpacking executables, which can be used to unpack and analyze an executable, but some malware will employ proprietary packers to further complicate any type of static analysis.

Encryption. Encryption of the executable's code and data segments prevents direct analysis. The ransomware decrypts itself at runtime, often using complex routines that further obfuscate the original code.

Code Obfuscation. Code obfuscation techniques include instruction substitution, control flow obfuscation, and junk code insertion. These methods make it difficult to follow the execution flow, to understand the logic of the code, and to use similarity functions to determine likeness to other malware family members.

Given the complexities of statically analyzing ransomware executables, dynamic analysis through sandboxing in an isolated environment is more advantageous. An on-premises sandbox solution is ideal, as it allows for complete control over the analysis process and access to post-attack disk images. Most cloud-based sandbox services do not permit access to these disk images and even if available, transferring large numbers of these images on a daily basis would be impractical.

Accordingly, we now turn to methods of safely causing ransomware to be executed, which is termed "detonation." Once samples are acquired, they can be detonated in accordance with embodiments of the present invention on a reference sandbox system. Although detonation can be performed manually on an isolated desktop or laptop computer, it is preferable to automate detonation on specially prepared virtual machines configured to detonate large numbers of samples. Some ransomware may not detonate on a VM or may require a specific environment, so manually detonating these exceptions is required. Some upfront configuration is required, such as disabling any pre-installed A/V software or disabling auto-updating or disabling screen savers. A reference set of documents of various file types and sizes is installed in various locations on the target computer. Generally, a library of reference disk images is created for different O/S versions and distributions ahead of time so a target computer can quickly be instantiated and prepared for detonation in mere seconds. Isolation of the network is essential, because many ransomware variants will attempt to browse the network for other target computers. Though some ransomware will detonate without network access, many ransomware samples will attempt to contact a C&C (Command and Control) server or just required network access in order to execute. Further information about our approach to detonation in accordance with embodiments of the present invention is provided in the attached Appendix on Detonation, which forms a part of this application and is incorporated herein by reference.

Once detonation is complete, the target computer is shut down and the disk image saved in an archive for later use. Aside from being used to analyze ransomware, these disk images are also used for generating data for machine learning training and validation purposes as well as for regression testing production software. Since production software used in various embodiments of the present invention is configured to analyze the contents of backups, the reference and detonated disk images must be converted into backups for processing. Customized applications can be used to generate backups from disk images as needed.

Following the detonation process, various types of analyses are performed on the post-attack disk images to identify the salient features and resulting types of corruption that the ransomware introduced to the target system. The original reference disk image and the attacked disk image are mounted side-by-side for comparison. A number of tools have been developed to quickly analyze the differences between the images on a file-by-file basis.

In analyzing the ransomware infection, in embodiments of the present invention, we typically consider aspects that include ransom note, file contents, file name conventions, the number of files attacked, effect on inode, and corrupt file timestamps. For example, in analyzing ransomware infection, we address considerations described below.

Ransom note. Is a ransom note saved in the file system? If so, what is its filename and contents? Were ransom notes dropped in each folder containing corrupted files? Or maybe in the root drive or specific directory, or in the desktop folder for each affected user?

File Contents. How were the contents of files corrupted? Were they encrypted or wiped out? In other words, does it appear that the original contents are still available or was this information wiped out? Did the ransomware encrypt the complete contents of the files? Did the amount of corrupt content vary with the size of the file or type of file? Was the file only partially corrupted or intermittently encrypted? What portions of the file were corrupted? What is the entropy of the corrupted data? Does it match that of the original content? Was it base64- or other base-encoded? Was it strongly encrypted using AES256, for example, or weakly encrypted using XOR or byte substitution ciphers? Was the content padded out to 16 bytes to accommodate one of the encryption algorithms? Was a header or trailer added to the file? Are there any common markers in the header or trailer that could be used to identify the ransomware? Is the increase in size of each corrupted file a fixed size or is it proportional to the size of the original file?

Filename conventions. Was the corrupted filename preserved or changed? How was the filename changed? Did it append a new file extension to each corrupted file? Were all the file extensions the same, from a small set of different file extensions, or did they appear to be randomly generated? Was the original filename still readable or completely obfuscated? Was a prefix prepended to the original filename? Was the original filename base64-encoded? Was the filename case-folded (uppercase letters changed to lowercase)?

Number of attacked files. How many files were attacked by this ransomware? Which folders or directories were attacked, what file extensions were targeted? Were there any size limitations, for example, only attacking small or large files?

Inode. Was the inode preserved or changed?

Corrupt file timestamps. How were the timestamp attributes affected for each file? Ransomware may update all timestamp attributes, or it may preserve atime and mtime or atime and ctime, or it may leave some attributes in undefined states, whereas some ransomware will go to the extreme of manipulating the system clock to allow all timestamp attributes to be preserved. After the detonation, check to see if the clock varies widely with what was expected.

Output from the analysis and commands can be used as input along with prompts to generate a description for the record in a ransomware database, which is maintained in accordance with an embodiment of the present invention. One of the major outputs of this analysis, in accordance with an embodiment of the present invention, is to identify the ransomware class based on its corruption fingerprint. Our analysis involves looking at the extent and type of corruption and includes whether it fully, partially, or intermittently encrypts each file, what type of encryption algorithm is used, whether there is any additional encoding performed, such as base64, and how the filename is modified.

In accordance with a further embodiment of the present invention, we preserve the results of our analysis of the ransomware in a database. In the database is stored information such as the name and family of the ransomware, the date upon which it was first observed in the field, our classification of the ransomware in terms of its behavior, the ransomware's identifiable file extension, description of the behavior of the ransomware including how it changes the original filename of each attacked file, how the contents of the file are corrupted, what type of encryption was used, was a new inode allocated to each file or was the original inode preserved, how were the timestamp attributes modified, was a ransom note left in the file system, if so how was it named and where was it dropped, was this ransomware analyzed by our systems, how many files were attacked, what was its file attack rate (files per hour), URLs to background and/or additional information on this particular sample, SHA256 signatures for each sample, detonated disk image names. The database is updated and stored on-premises on a regular basis and is used for many purposes, from generating a ransomware signature database for production, code generators for adding ransomware file extensions for production, reporting on what features to focus resources on, used by sales and sales engineers for educating customers on specific attacks, used for various testing purposes to ensure test coverage across many different ransomware classes, etc.

FIG. 3 is a sample of a database of ransomware variants categorized based on attack profile, in accordance with an embodiment of the present invention. Ransomware variants 301 are analyzed based on information acquired or found in testing, and then categorized into a class based on an attack profile, e.g. full encryption/no file name change, full encryption/known ransomware extension.

FIG. 4 is a chart showing types of detonation of ransomware employed in accordance with an embodiment of the present invention. Manual detonations 402 are performed using physical disks, are supervised and assisted, and are scheduled as a routine (e.g., daily) on newly introduced variants with analysis and reports added weekly. Scripted detonations 403 are performed using virtual machines, are unsupervised and unassisted, and are scheduled as batch runs that catch up with older variants of ransomware. Scripted detonations 403 are useful when the volume of files is high and unpredictable.

FIG. 5 is a sample of a directory listing of a disk image of data that have been detonated by ransomware in accordance with an embodiment of the present invention.

FIG. 6 is a statistical profile, of a data sample, developed in accordance with an embodiment of the present invention. The statistical profile may be a text file containing the contents of the cloud service report. The information in the cloud service report is used to verify the operation of the ML models.

In addition to identifying ransomware and storing data pertaining to ransomware, in embodiments of the present invention, we use this information to feed the next stage of processing, data generation. For this purpose, we use the Security Analytics Generative (SAGEN) pipeline. In accordance with embodiments of the present invention, the Security Analytics Generative pipeline is used to generate data to train and validate our machine learning (ML) algorithms. The SAGEN pipeline uses data from detonated backups as well as other sources to create training data. The ransomware database is also used to provide additional information for each detonated disk image such as the name, location, and class of ransomware. This is used by SAGEN to ensure that the training and validation data represent a comprehensive number of observed behaviors based on the ransomware class. It also allows the distribution of classes to be changed in event that the resulting model shows some weakness in particular types of ransomware.

The training of the ML models for detecting ransomware requires millions of backups representing a large number of backup scenarios. For example, these would include backups from various O/S platforms, full and incremental backups, different application agent backups, different distributions of file types and sizes, different file infection rates, different types of nominal file operations, and different classes of ransomware attacked files. It would not be practical to create actual backups of these use-cases, so we end up constructing virtual backups of all these scenarios derived from the file events recorded in the initial set of actual backups.

In various embodiments of the present invention, training of ML models is achieved by processes as follows:

A. Index a large corpus of ransomware detonated backups, nominal clean backups, and artificial backups including sets of individual files and their versions over decades of time from a variety of internet and local sources.

B. After indexing, file events and associated metrics and indicators are extracted and saved individually for each backup in a CSV file.

C. File event sets are then constructed that represent how files changed across backups. File event sets are divided into nominal and attacked file operations representing deleted, created, renamed, unchanged, and changed files. These are stored in another set of CSV files.

D. Since the disk images of ransomware attacks also tend to include a variety of non-related activities, another step is performed to extract out the file events that were directly attributed to the ransomware attack. If this were not performed, then virtual attacked backups with small numbers of files may statistically include files not related to the ransomware attack and would therefore be mislabeled as a ransomware attack and possibly diminish the detection capabilities of the ML models.

E. Validation test sets are generated from the original nominal and ransomware detonated backups.

F. Work lists are constructed which combine the statistically sampled nominal and infected events into a large variety of backup scenarios. Various distributions are used to generate this data based on analysis of customer backups.

G, Work lists are submitted to multiple servers to create the specified virtual backups, are then analyzed, and the resulting features and indicators extracted into a structured dataset (csstats) for model training and validation purposes. These features are partitioned into prior and current backups, and further subdivided into deleted, created, changed, and unchanged files categories. Within each of these categories, counts of various file type categories (office documents, emails, images, executables, etc.), average file size, average entropy, counts above specific thresholds, corrupt file counts, file type extension mismatches, and more. This information is stored in a CSV file and ready for data preparation in the model-training pipeline.

H. Each sample is uniquely identified as to its original backup source and composition so it can be traced back to its' source if needed. This allows datasets to be constructed from disparate sources and more importantly, during model training, samples composed from any particular source can be guaranteed not to appear in both the training and validation datasets during model training.

Although there are a number of different ransomware classes that we could ask the ML model to distinguish from one another, we end up merging many of the classes together such that we are left with 4 different classes in all:
  0—clean
  1—corrupted content with original filename
  4—corrupted content with well-known ransomware file extension
  6—corrupted content and obfuscated filename Ultimately, the goal is to distinguish nominal backups (class 0) from backups that contain corrupted files, but it is useful to include the classification of the major classes as this information can be used in the post-attack analysis to improve the quality of the results when retrieving a list of corrupted files. However, attempting to classify all defined classes would result in a large number of misclassifications errors because many classes are very similar to one another and it is not useful to distinguish between them for recovery purposes.

Initially, the data preparation process builds training and validation with approximately equal numbers of each of the four ransomware classes. In other words, 25% of the samples are from class 0, 25% from class 1, and so on. This categorization will initially create a model that is bias towards better recall than precision. This is in anticipation of the fine-tuning process, where these percentages will be adjusted depending on the amount of data added from incorrectly predicted out-of-sample customer data to strike a balance between good recall and a false positive rate that is acceptable to customers.

In embodiments of the present invention, we use the xgboost machine learning (ML) algorithm to perform training and inference. XGBoost (eXtreme Gradient Boosting) is an advanced implementation of the gradient boosting algorithm, leveraging decision trees as its base learners and designed for efficiency, flexibility, and performance. It is available as an open-source library developed by Tianqi Chen and others. See [1603.02754] XGBoost: A Scalable Tree Boosting System, https://arxiv.org/pdf/1603.02754). XGBoost is widely used for supervised learning tasks, such as regression, classification, and ranking. Some of the key features of XGBoost include:

1. Gradient Boosting Framework: XGBoost builds additive models in a forward stage-wise manner, allowing the optimization of arbitrary differentiable loss functions.

2. Regularization: The algorithm includes both L1 (Lasso) and L2 (Ridge) regularization, helping to prevent overfitting and improving model generalization.

3. Parallel Processing: XGBoost supports parallel tree boosting, making it highly efficient on large datasets.

4. Tree Pruning: It uses a depth-first approach and a quantile sketch algorithm to handle sparse data efficiently.

5. Handling Missing Values: XGBoost automatically learns the best imputation values for missing data during the training process.

6. Scalability: The implementation is designed to scale to billions of examples and can be deployed in a distributed environment.

In the context of the present invention, we chose this algorithm for its superior classification performance on tabular or structured data, excellent run-time performance, GPU support to speed up model training times, and simplified data preparation handling via support of missing values and category features. In our implementation, XGBoost is configured for early stopping whereby training is halted when no further progress is observed for a specified number of iterations. This prevents over-optimization of the model to the training data, thereby reducing the risk of overfitting. Additionally, each decision tree is restricted to a maximum depth of two, ensuring that any one decision tree in the model does not become too specific. Furthermore, this embodiment utilizes a multi-language environment. Models are initially trained using the Python version of the XGBoost library. Python allows for greater flexibility, experimentation, and has a multitude of tools available for ML development. For deployment to the field, the C++ version of the xgboost library is used for optimal performance and seamless integration with our production software.

Fine-tuning generally refers to adjusting a model after it has been trained on an initial set of data. ML models such as neural nets facilitate fine-tuning, because it is straightforward to freeze specific layers and allow the weights of other layers to be adjusted by training with additional samples of data. Though it is possible to fine-tune an xgboost model, it is easier to fine-tune the data instead. One of the pitfalls of fine-tuning an existing model is that the act of changing the initial foundation model may cause it to behave in undesirable or unpredictable ways. The model may have generalized some behaviors across multiple use-cases via a small set of weights and if one of those new fine-tuning use-cases happens to cause these weights to be updated, it could cause an impact on the predictions made in these other use-cases. A similar situation can occur with xgboost decision trees as well. In the case of our use of xgboost, since training a specific set of models may take on the order of hours, using unsupervised learning to first cull and eliminate conflicting samples and then retraining again from scratch is practical to perform. If the new fine-tuned data are different from data in other use-cases, the model training is free to separate out these concerns to avoid the new fine-timed data from interfering with the other use-cases.

The raw features that are generated by the SAGEN pipeline for training/validation and by our production software are algebraically manipulated before being submitted to the ML algorithm. This preparation of the raw features is commonly referred to as "feature engineering." Feature engineering involves transforming raw data into a format that can be more effectively utilized by ML algorithms. It is a crucial process because the quality and representation of features directly impact the performance of the ML models. A number of techniques are utilized including converting absolute valued features into percentages, computing the difference between raw features, and creating interaction features, which are specific combinations of raw features to bring out specific signals based on the characteristics of different ransomware classes. These newly generated features are then made available to the ML algorithms for processing.

We also use a number of techniques to identify whether features are relevant to predicting the target variable. These techniques include XGBoost's built-in feature relevance, permutation feature relevance, Local Interpretable Model-Agnostic Explanations (LIME), Shapley Additive explanations (SHAP), and eliminating collinear or highly correlated features. Features that are found to be irrelevant or highly correlated with other features are eliminated. Additionally, raw features that contain absolute and practically unbounded values are replaced with their percentage or delta percentages, such as file count, as these unbounded values can hinder the model's ability to generalize well. This approach not only enhances model performance but also ensures that the models are interpretable, reliable, and free from redundancy.

Figure 7:
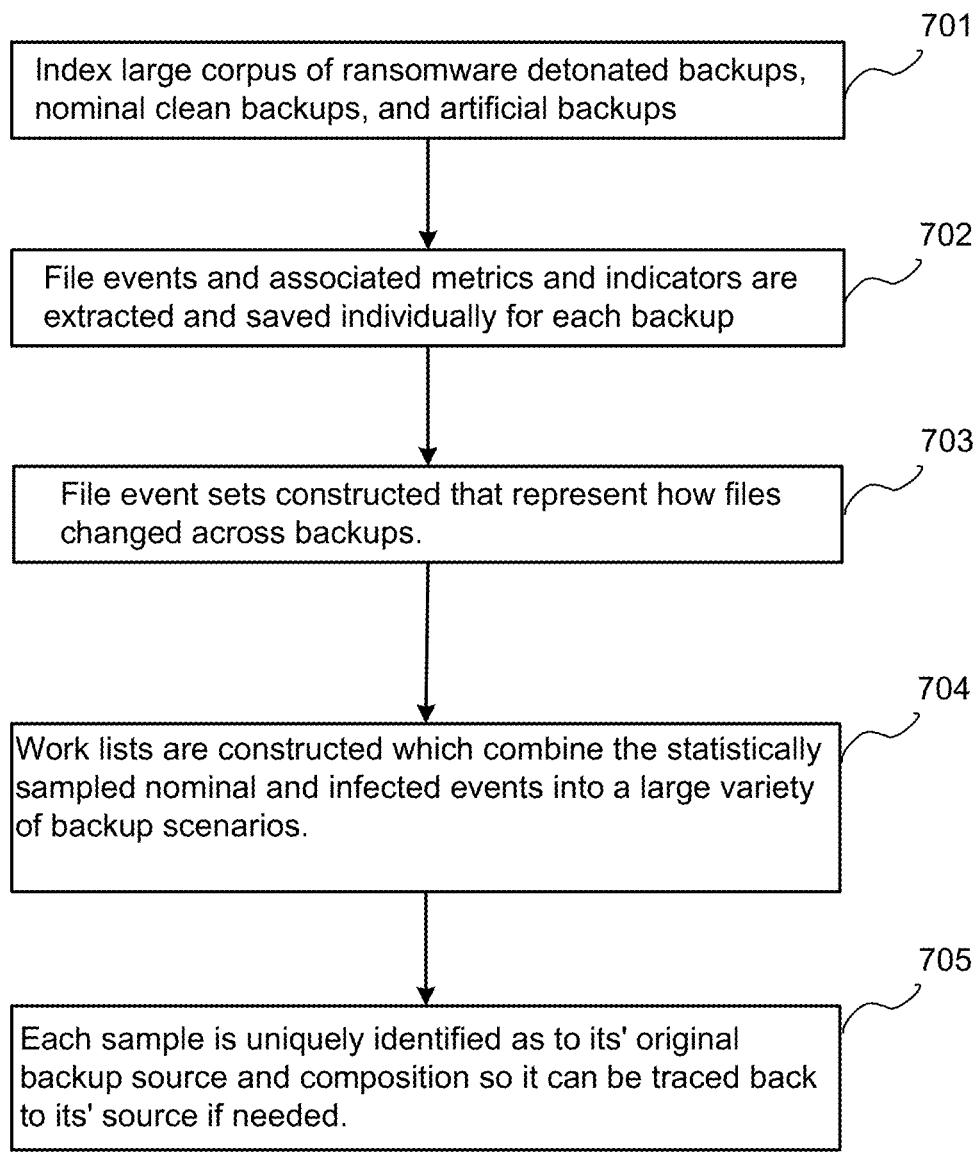
FIG. 7 is a block diagram illustrating the logical flow of training and validation data set generation in accordance with an embodiment of the present invention.

FIG. 7 is a block diagram illustrating the logical flow of training and validation data set generation in accordance with an embodiment of the present invention. The machine learning engine 105 indexes 701 a large corpus of ransomware detonated backups, nominal clean backups, and artificial backups consisting of sets of individual files and their versions over decades of time from a variety of internet and local sources. File events and associated metrics and indicators are extracted and saved individually for each backup 702. File event sets are then constructed 703 that represent how files changed across backups. File event sets are divided into nominal and attacked file operations representing deleted, created, renamed, unchanged, and changed 703. Validation test sets are generated from the original nominal and ransomware detonated backups. Work lists are constructed which combine the statistically sampled nominal and infected events into a large variety of backup scenarios 704. This may include various types of file systems backups for various O/S platforms, full and incremental backups, different distributions of file types and sizes, different file infection rates, different types of nominal file operations, and different classes of ransomware attacked files. Each sample is uniquely identified as to its' original backup source and composition so it can be traced back to its' source if needed 705. This allows datasets to be constructed from disparate sources and more importantly, during model training, samples composed from any particular source can be guaranteed not to appear in both the training and validation datasets during model training.

Figure 8:
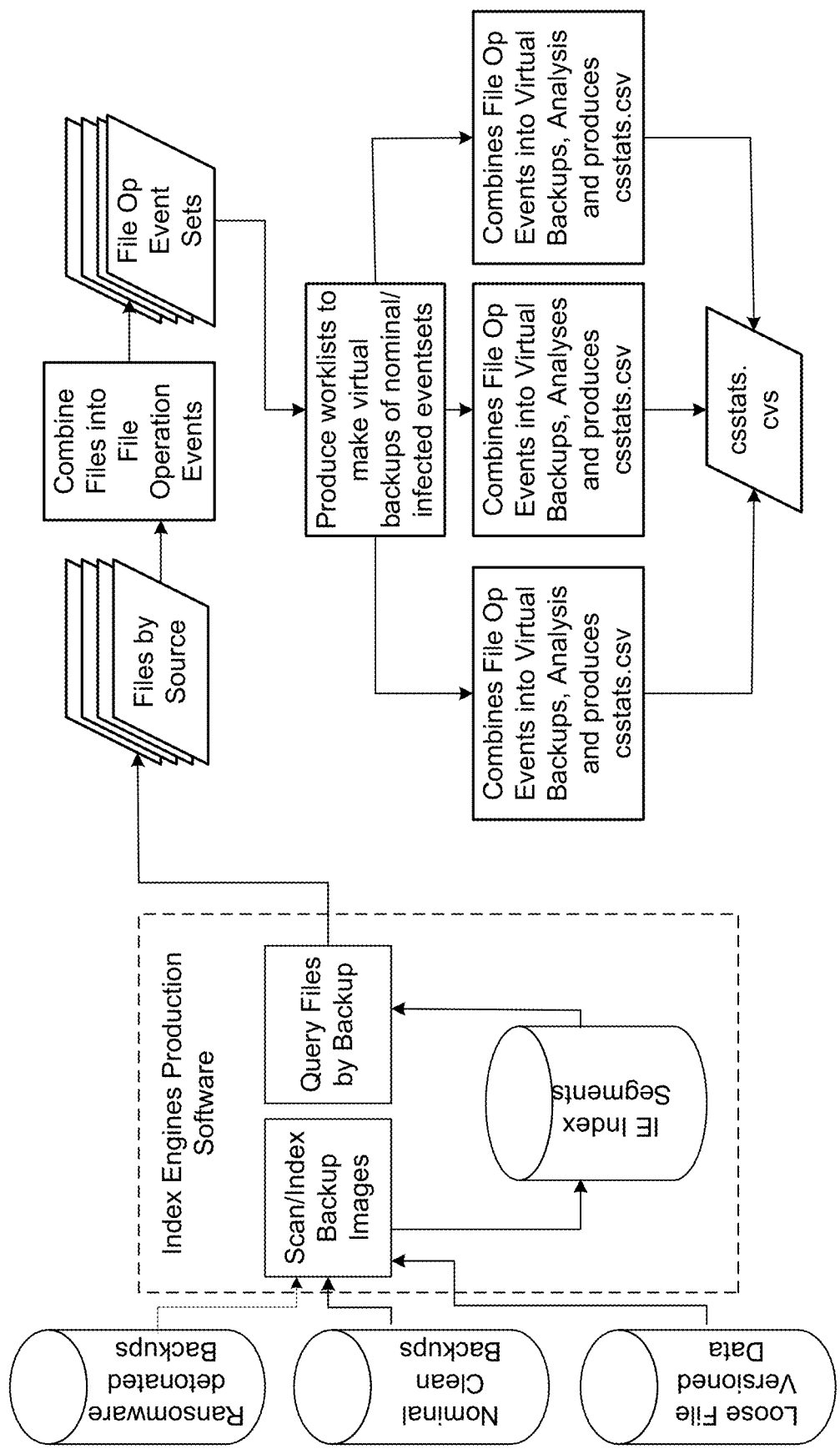
FIG. 8 is a more detailed diagram illustrating the processes of FIG. 7.

FIG. 8 is a more detailed diagram illustrating the processes of FIG. 7. The processes collectively form the data generation pipeline.

Figure 9:
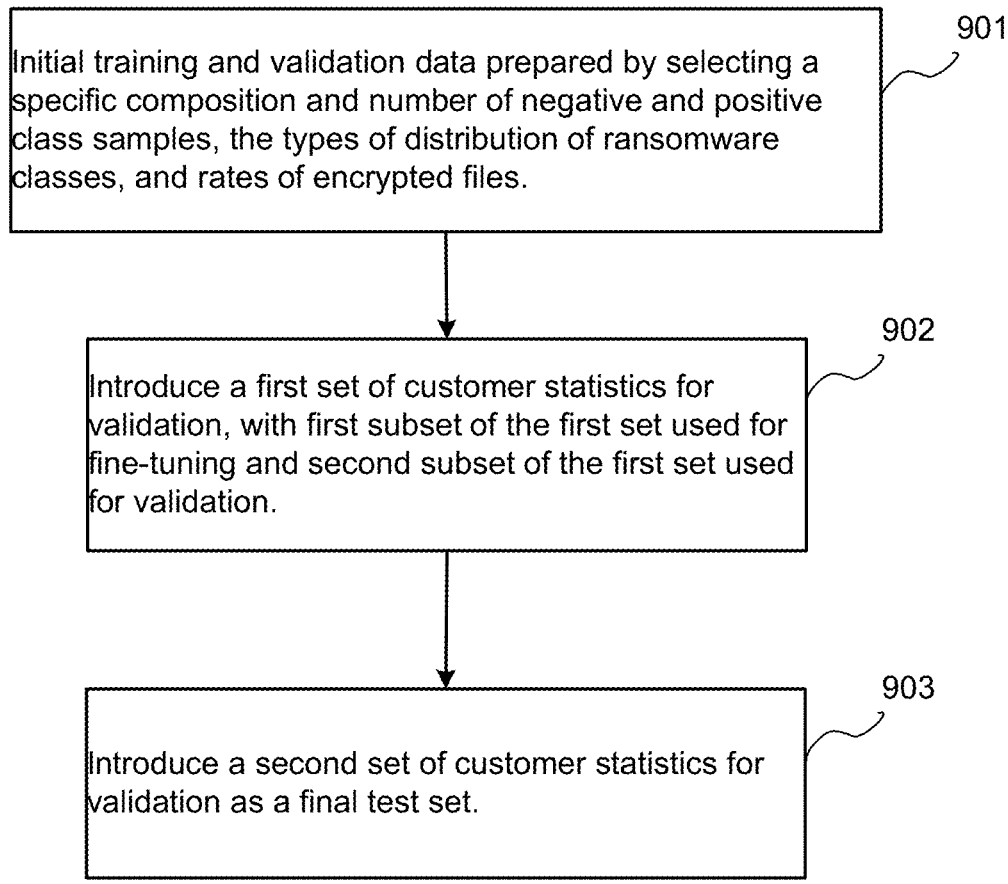
FIG. 9 is a block diagram illustrating preparation of data used for training the AI system in accordance with an embodiment of the present invention.

FIG. 9 is a block diagram illustrating preparation of data used for training the AI system in accordance with an embodiment of the present invention. The initial training and validation data are prepared by selecting a specific composition and number of negative and positive class samples, the types of distribution of ransomware classes, and rates of encrypted files 901. The initial base SAGEN training set is 500K samples and 125K put aside for validation. Additional samples are added as the training pipeline proceeds. After the initial training, a first set of customer statistics are introduced for validation 902, where a first subset of the first set is used for fine-tuning, and a second subset of the first set are used for validation. For example, 15.1 million out of 100 million older customer samples may be randomly selected for validation during training, where the first half is used for fine-tuning, and the second half for pure validation. A second set of customer statistics are then introduced for validation 903 as a final test set 903. For example, a sample of 30 million out of 100 million recent customer data samples may be randomly selected and assembled into a final test set.

Figure 10:
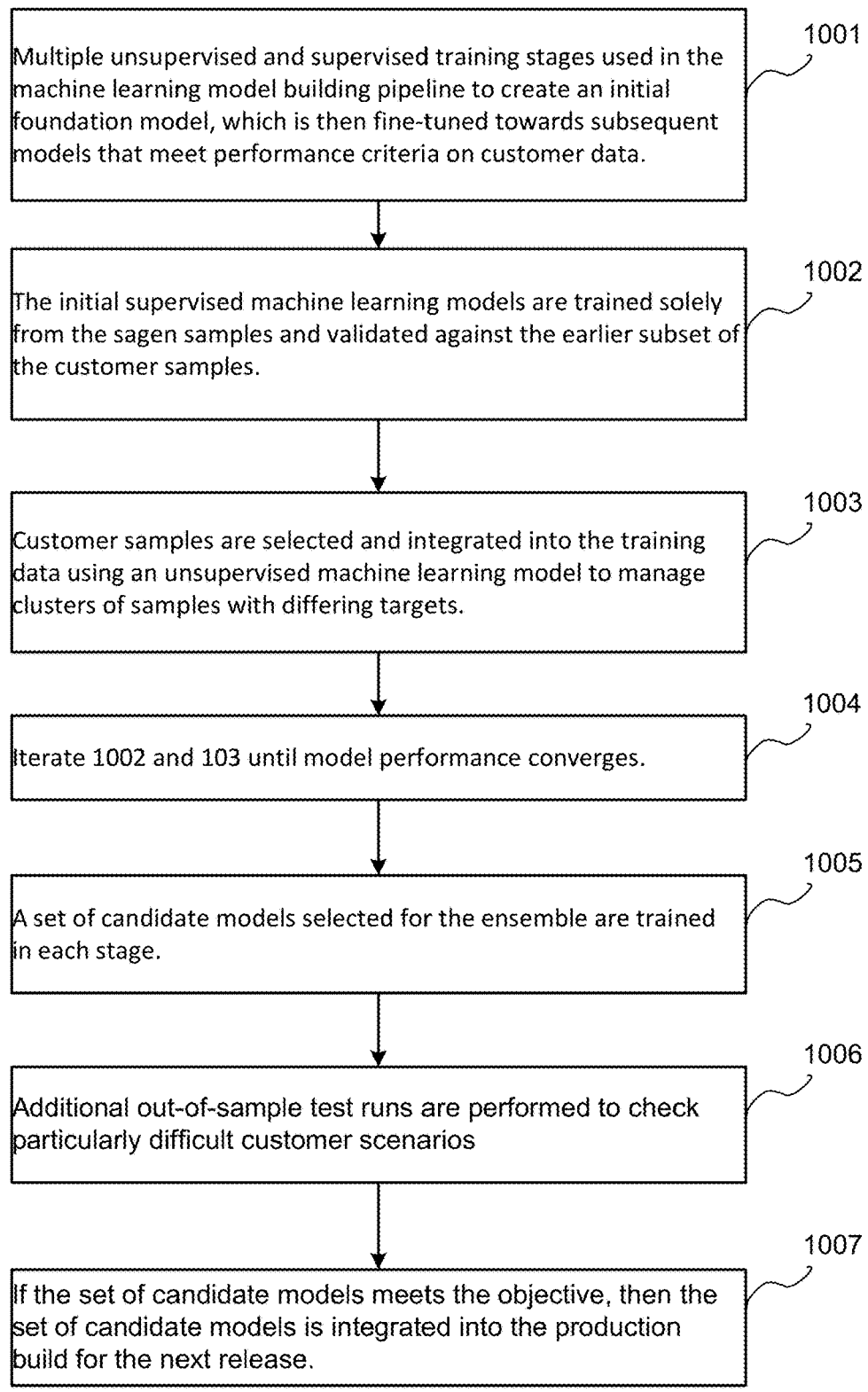
FIG. 10 is a block diagram illustrating processes in training of the AI system in accordance with an embodiment of the present invention.

FIG. 10 is a block diagram illustrating processes in training of the AI system in accordance with an embodiment of the present invention. Multiple unsupervised and supervised training stages are used in the machine learning model building pipeline to create an initial foundation model, which is then fine-tuned towards subsequent models that meet performance criteria on customer data 1001. The initial supervised machine learning models are trained solely from the SAGEN samples and validated against an earlier subset of customer samples 1002. Customer samples are selected and integrated into the training data using an unsupervised machine learning model to manage clusters of samples with differing targets 1003. Steps 1003 and 1004 are iterated until the model performance converges 1004. The first iteration typically adds 6,000 customer samples to the new training data for subsequent training phases and quickly reduces to only a few extra samples after three or four iterations. One of the reasons for the use of this iterative training process is to align the model to the customer's data as there is a slight amount of data drift between the customer samples and the SAGEN training/validation data resulting in excessive false positives. Though the initial foundation model can accurately represent approximately 99.75% of all the customer backup scenarios, the remaining 0.25% is addressed via the fine-tuning process. Data drift is periodically monitored via our cloud service and new models trained if performance starts to degrade. A set of candidate models (e.g., 10 models) are selected for the ensemble and are trained in each stage 1005. The testing may use Group K-Fold based on the unique sample IDs to ensure sample sources from the same backups are not present in both the training and validation models. Once a set of candidate models are selected, additional out-of-sample test runs are performed to check particularly difficult customer scenarios 1006, such as on backups with low ransomware encryption rates and minimally partially encrypted test cases, and on the most recent 30 million customer samples. If the set of candidate models meets the objective, then the set of candidate models is integrated into the production build for the next release 1007.

Figure 11:
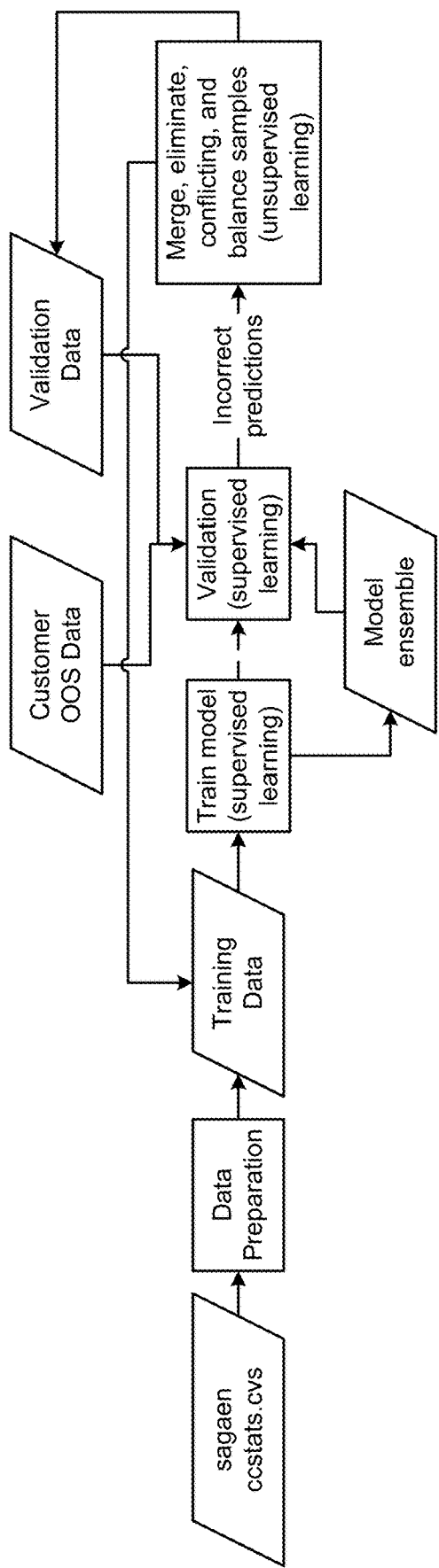
FIG. 11 is a block diagram providing a more detailed view of the processes of FIGS. 9 and 10.

FIG. 11 is a block diagram providing a more detailed view of the processes of FIGS. 9 and 10.

We have developed a recall model to evaluate an embodiment of the present invention in predicting a likelihood of a presence of a ransomware attack in a set of samples of computer data. Our recall model compares the percentage of True Positives (TP) and False Negatives (FN) as follows:

Recall=TP/(TP+FN).

With 125,000 data samples, of which 94,100 data samples were infected with ransomware corruption, the embodiment successfully detected 94,097 of these infected samples with three false negatives, corresponding to a prediction accuracy of 99.99%. Similarly, the embodiment predicted one false positive out of 30,895 samples, with a prediction accuracy of 99.99% SLA for detection of data corruption due to ransomware.

Figure 12:
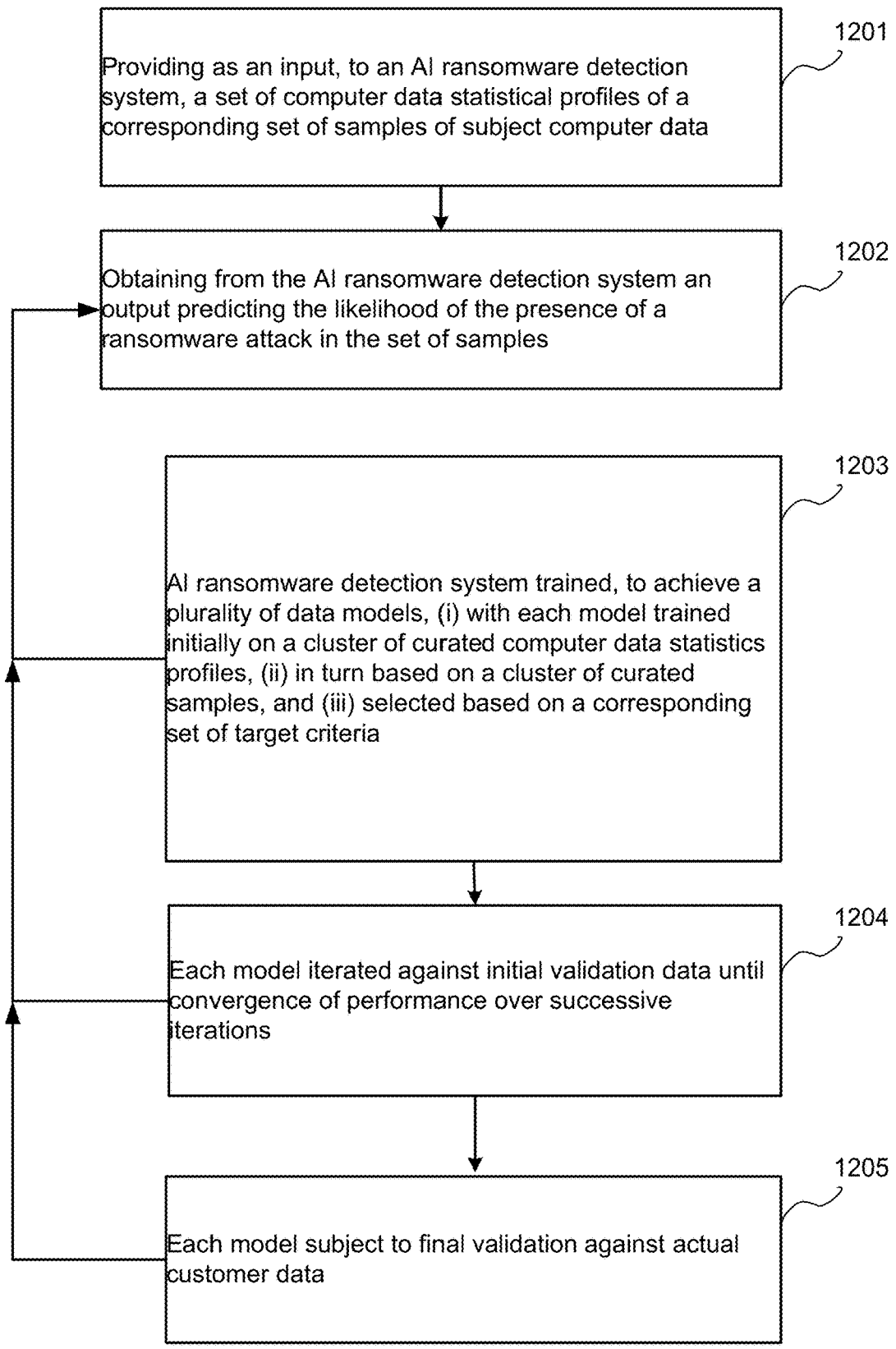
FIG. 12 is a block diagram illustrating process flow from an input of a set of statistical profiles of samples of data to an output of a prediction of a likelihood of a presence of a ransomware attack.

FIG. 12 is a block diagram illustrating process flow, in accordance with an embodiment of the present invention, for assessing a likelihood of a presence of a ransomware attack on computer resources. In this embodiment, in process 1201, there is provided as an input, to an AI ransomware detection system, a set of computer data statistical profiles of a corresponding set of samples of subject computer data, including data content and metadata. In process 1202, there is obtained from the AI ransomware detection system an output predicting the likelihood of the presence of a ransomware attack in the set of samples of subject computer data. Process 1203 shows that the AI ransomware detection system utilizes a machine learning system trained, to achieve a plurality of data models, (i) with each model trained initially on a corresponding cluster of curated computer data statistics profiles, (ii) each cluster of curated data statistics profiles being statistics characterizing a corresponding cluster of curated samples resulting from exposing a selection of raw data samples to processing by actual ransomware, and (iii) each selection of raw data samples reflecting a corresponding set of target criteria governing the selection. Process 1204 shows that each model is iterated against initial validation data until there results a convergence of performance over successive iterations, with a determination during such iterations to ensure that sample sources from the same backups are not present in both training and validation models. In process 1205, the plurality of models is subject to final validation against actual customer data to address data drift between the curated samples and the actual customer data that would otherwise result in excessive false predictions.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

IMPLEMENTATION EXAMPLES

Without limitation, potential subject matter that may be claimed (prefaced with the letter "P" so as to avoid confusion with the actual claims presented below) includes:

P1. A method of assessing a likelihood of a presence of a ransomware attack on computer resources, the method comprising: providing as an input, to an AI ransomware detection system, a set of computer data statistical profiles derived from a corresponding set of samples of subject computer data, including data content and metadata; and obtaining from the AI ransomware detection system an output predicting the likelihood of the presence of a ransomware attack in the set of samples of subject computer data; wherein: the AI ransomware detection system utilizes a machine learning system trained, to achieve a plurality of data models, (i) with each model trained initially on a corresponding cluster of curated computer data statistics profiles, (ii) each cluster of curated data statistics profiles being statistics characterizing a corresponding cluster of curated samples resulting from exposing a selection of raw data samples to processing by actual ransomware, and (iii) each selection of raw data samples reflecting a corresponding set of target criteria governing the selection; each model subject to a plurality of iterations against initial validation data until there results a convergence of performance over successive iterations, with a determination during such iterations to ensure that sample sources from the same backups are not present in both training and validation models; and the plurality of models has been subject to final validation against actual customer data to address data drift between the curated samples and the actual customer data that would otherwise result in excessive false predictions.

P2. A method according to P1, wherein the curated samples are derived systematically from a pipeline of data from detonated backups and other sources to create training data.

P3. A method according to P1, wherein each machine learning model has been trained to distinguish among ransomware classes selected from the group consisting of (a) clean, (b) corrupted content with original filename, (c) corrupted content with well-known ransomware file extension, and (d) corrupted content with obfuscated filename.

P4. A method according to P3, wherein each machine learning model has been further trained on the corresponding cluster of curated computer data statistics profiles that comprise a selection of clean data samples not exposed to actual ransomware and a selection of artificially generated data samples.

P5. A method according to P4, wherein each machine learning model has been further trained on the corresponding cluster of curated computer data statistics profiles that comprise virtual data samples generated based on analyses of the selection of raw data samples exposed to processing by the actual ransomware, the selection of clean data samples not exposed to actual ransomware, and the selection of artificially generated data samples.

P6. A method according to P1, wherein each cluster of curated data statistics profiles further being statistics characterizing a corresponding family of ransomware based on behavior during the processing of the raw data samples.

P7. A method according to P1, wherein each machine learning model has been subject to the plurality of iterations against the initial validation data prepared by selecting a specific composition of class samples, ransomware classes, and rates of encrypted files.

P8. A method according to P7, wherein each machine learning model has been fine-tuned after being initially training using a set of customer statistics.

P9. A non-transitory computer readable storage medium encoded with instructions, that, when executive by an artificial intelligence (AI) ransomware detection system establishes computer processes for assessing a likelihood of a presence of a ransomware attack on computer resources, the computing processes comprising: providing as an input, to the AI ransomware detection system, a set of computer data statistical profiles derived from a corresponding set of samples of subject computer data, including data content and metadata; and obtaining from the AI ransomware detection system an output predicting the likelihood of the presence of a ransomware attack in the set of samples of subject computer data; wherein: the AI ransomware detection system utilizes a machine learning system trained, to achieve a plurality of data models, (i) with each model trained initially on a corresponding cluster of curated computer data statistics profiles, (ii) each cluster of curated data statistics profiles being statistics characterizing a corresponding cluster of curated samples resulting from exposing a selection of raw data samples to processing by actual ransomware, and (iii) each selection of raw data samples reflecting a corresponding set of target criteria governing the selection; each model subject to a plurality of iterations against initial validation data until there results a convergence of performance over successive iterations, with a determination during such iterations to ensure that sample sources from the same backups are not present in both training and validation models; and the plurality of models has been subject to final validation against actual customer data to address data drift between the curated samples and the actual customer data that would otherwise result in excessive false predictions.

P10. A non-transitory computer-readable medium according to P9, wherein the curated samples are derived systematically from a pipeline of data from detonated backups and other sources to create training data.

P11. A non-transitory computer-readable medium according to P9, wherein each machine learning model has been trained to distinguish among ransomware classes selected from the group consisting of (a) clean, (b) corrupted content with original filename, (c) corrupted content with well-known ransomware file extension, and (d) corrupted content with obfuscated filename.

P12. A non-transitory computer-readable medium according to P11, wherein each machine learning model has been further trained on the corresponding cluster of curated computer data statistics profiles that comprise a selection of clean data samples not exposed to actual ransomware and a selection of artificially generated data samples.

P13. A non-transitory computer-readable medium according to P12, wherein each machine learning model has been further trained on the corresponding cluster of curated computer data statistics profiles that comprise virtual data samples generated based on analyses of the selection of raw data samples exposed to processing by the actual ransomware, the selection of clean data samples not exposed to actual ransomware, and the selection of artificially generated data samples.

P14. A non-transitory computer-readable medium according to P9, wherein each cluster of curated data statistics profiles further being statistics characterizing a corresponding family of ransomware based on behavior during the processing of the raw data samples.

P15. A non-transitory computer-readable medium according to P9, wherein each machine learning model has been subject to the plurality of iterations against the initial validation data prepared by selecting a specific composition of class samples, ransomware classes, and rates of encrypted files.

P16. A non-transitory computer-readable medium according to P15, wherein each machine learning model has been fine-tuned after being initially training using a set of customer statistics.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of assessing a likelihood of a presence of a ransomware attack on computer resources, the method comprising:
    providing as an input, to an AI ransomware detection system, a set of computer data statistical profiles derived from a corresponding set of samples of subject computer data, including data content and metadata; and
    obtaining from the AI ransomware detection system an output predicting the likelihood of the presence of a ransomware attack in the set of samples of subject computer data;
    wherein:
    the AI ransomware detection system utilizes a machine learning system trained, to achieve a plurality of data models, (i) with each model trained initially on a corresponding cluster of curated computer data statistics profiles, (ii) each cluster of curated data statistics profiles being statistics characterizing a corresponding cluster of curated samples resulting from exposing a selection of raw data samples to processing by actual ransomware, and (iii) each selection of raw data samples reflecting a corresponding set of target criteria governing the selection;
    each model subject to a plurality of iterations against initial validation data until there results a convergence of performance over successive iterations, with a determination during such iterations to ensure that sample sources from the same backups are not present in both training and validation models; and
    the plurality of data models has been subject to final validation against actual customer data to address data drift between the curated samples and the actual customer data that would otherwise result in excessive false predictions.

2. A method according to claim 1, wherein the curated samples are derived systematically from a pipeline of data from detonated backups and other sources to create training data.

3. A method according to claim 1, wherein each machine learning model has been trained to distinguish among ransomware classes selected from the group consisting of (a) clean, (b) corrupted content with original filename, (c) corrupted content with well-known ransomware file extension, and (d) corrupted content with obfuscated filename.

4. A method according to claim 3, wherein each machine learning model has been further trained on the corresponding cluster of curated computer data statistics profiles that comprise a selection of clean data samples not exposed to actual ransomware and a selection of artificially generated data samples.

5. A method according to claim 4, wherein each machine learning model has been further trained on the corresponding cluster of curated computer data statistics profiles that comprise virtual data samples generated based on analyses of the selection of raw data samples exposed to processing by the actual ransomware, the selection of clean data samples not exposed to actual ransomware, and the selection of artificially generated data samples.

6. A method according to claim 1, wherein each cluster of curated data statistics profiles further being statistics characterizing a corresponding family of ransomware based on behavior during the processing of the raw data samples.

7. A method according to claim 1, wherein each machine learning model has been subject to the plurality of iterations against the initial validation data prepared by selecting a specific composition of class samples, ransomware classes, and rates of encrypted files.

8. A method according to claim 7, wherein each machine learning model has been fine-tuned after being initially training using a set of customer statistics.

9. A non-transitory computer readable storage medium encoded with instructions, that, when executive by an artificial intelligence (AI) ransomware detection system establishes computer processes for assessing a likelihood of a presence of a ransomware attack on computer resources, the computing processes comprising:
    providing as an input, to the AI ransomware detection system, a set of computer data statistical profiles derived from a corresponding set of samples of subject computer data, including data content and metadata; and
    obtaining from the AI ransomware detection system an output predicting the likelihood of the presence of a ransomware attack in the set of samples of subject computer data;
    wherein:
    the AI ransomware detection system utilizes a machine learning system trained, to achieve a plurality of data models, (i) with each model trained initially on a corresponding cluster of curated computer data statistics profiles, (ii) each cluster of curated data statistics profiles being statistics characterizing a corresponding cluster of curated samples resulting from exposing a selection of raw data samples to processing by actual ransomware, and (iii) each selection of raw data samples reflecting a corresponding set of target criteria governing the selection;

each model subject to a plurality of iterations against initial validation data until there results a convergence of performance over successive iterations, with a determination during such iterations to ensure that sample sources from the same backups are not present in both training and validation models; and the plurality of data models has been subject to final validation against actual customer data to address data drift between the curated samples and the actual customer data that would otherwise result in excessive false predictions.

10. A non-transitory computer-readable medium according to claim 9, wherein the curated samples are derived systematically from a pipeline of data from detonated backups and other sources to create training data.

11. A non-transitory computer-readable medium according to claim 9, wherein each machine learning model has been trained to distinguish among ransomware classes selected from the group consisting of (a) clean, (b) corrupted content with original filename, (c) corrupted content with well-known ransomware file extension, and (d) corrupted content with obfuscated filename.

12. A non-transitory computer-readable medium according to claim 11, wherein each machine learning model has been further trained on the corresponding cluster of curated computer data statistics profiles that comprise a selection of clean data samples not exposed to actual ransomware and a selection of artificially generated data samples.

13. A non-transitory computer-readable medium according to claim 12, wherein each machine learning model has been further trained on the corresponding cluster of curated computer data statistics profiles that comprise virtual data samples generated based on analyses of the selection of raw data samples exposed to processing by the actual ransomware, the selection of clean data samples not exposed to actual ransomware, and the selection of artificially generated data samples.

14. A non-transitory computer-readable medium according to claim 9, wherein each cluster of curated data statistics profiles further being statistics characterizing a corresponding family of ransomware based on behavior during the processing of the raw data samples.

15. A non-transitory computer-readable medium according to claim 9, wherein each machine learning model has been subject to the plurality of iterations against the initial validation data prepared by selecting a specific composition of class samples, ransomware classes, and rates of encrypted files.

16. A non-transitory computer-readable medium according to claim 15, wherein each machine learning model has been fine-tuned after being initially training using a set of customer statistics.

* * * * *